United States Patent [19]

Bell

[11] 4,441,193

[45] Apr. 3, 1984

[54] FREQUENCY-ENCODING CIRCUIT FOR REDUCING DISTORTION

[75] Inventor: John L. Bell, Escondido, Calif.

[73] Assignee: Burroughs Corporation, Detroit, Mich.

[21] Appl. No.: 374,506

[22] Filed: May 3, 1982

[51] Int. Cl.³ .............................................. H04L 27/10
[52] U.S. Cl. .......................................... 375/36; 375/49; 360/43; 340/347 DD
[58] Field of Search ...................... 375/25, 49, 60, 113, 375/36, 99; 360/40, 43, 48; 340/347 DD; 455/113

[56] References Cited

U.S. PATENT DOCUMENTS

| | | | |
|---|---|---|---|
| 3,108,261 | 4/1960 | Miller | 375/19 |
| 3,750,108 | 7/1973 | Jensen | 360/43 |
| 3,980,826 | 9/1976 | Widmer | 375/36 |
| 4,007,335 | 2/1977 | Hetherington et al. | 199/16 AA |
| 4,167,760 | 9/1979 | Decker | 360/43 |
| 4,234,897 | 11/1980 | Miller | 360/45 |
| 4,287,596 | 9/1981 | Chari | 375/49 |
| 4,376,958 | 3/1983 | Pettigrew | 360/43 |

Primary Examiner—Robert L. Griffin
Assistant Examiner—Stephen Chin
Attorney, Agent, or Firm—Charles J. Fassbender; Kevin R. Peterson

[57] ABSTRACT

An electronic circuit produces a composite signal in which a low frequency component signal is followed by a high frequency component signal such that the composite signal resists transmission line distortion. To that end, the circuit generates the half-cycle of the high frequency component signal that immediately follows the low frequency component signal with a time duration that is longer than one-half the period of the high frequency by a predetermined amount of time; and then it generates the next half-cycle of the high frequency component signal with a time duration that is less than one-half the period of the high frequency by a like amount of time.

11 Claims, 11 Drawing Figures

FIG.1.
Prior Art
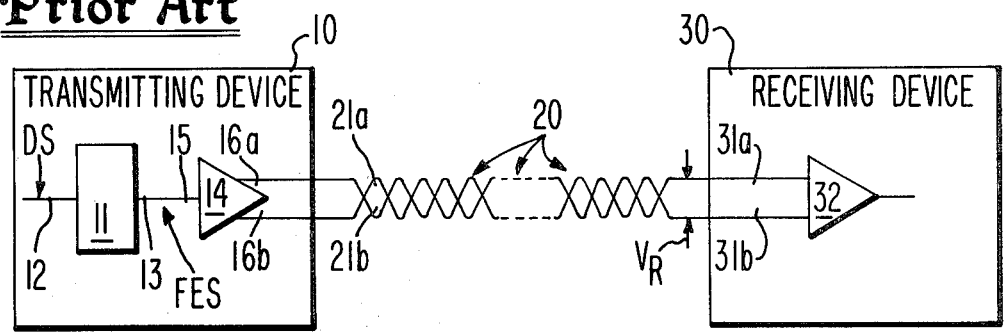
FIG.2.
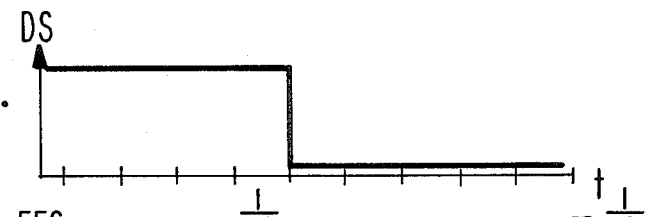
FIG.2A.
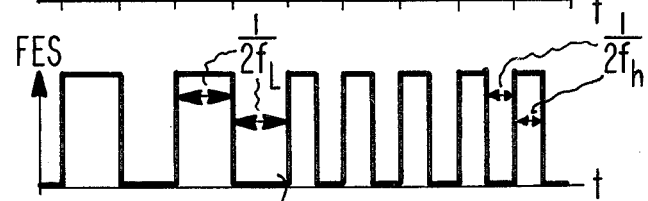
FIG.2B.
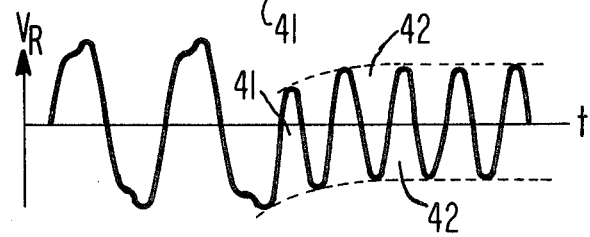
FIG.2C.
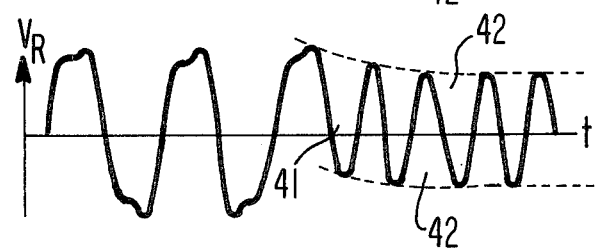
FIG.2D.

FREQUENCY-ENCODING CIRCUIT FOR REDUCING DISTORTION

BACKGROUND OF THE INVENTION

This invention relates to the art of encoding electrical signals for transmission over a long cable; and more particularly, it relates to the art of frequency-encoding digital signals in a manner which reduces their distortion at the receiving end of the cable.

One system in which such frequency-encoded digital signals are transmitted is illustrated in FIG. 1. This system includes a device 10 having an encoder 11 that receives digital signals on an input terminal 12 and converts them to frequency-encoded signals on an output terminal 13. A transmitter 14 receives the frequency-encoded signals on an input terminal 15 and converts them to a pair of differential frequency-encoded signals on a pair of output terminal 16a and 16b.

Terminals 16a and 16b couple to one end of a long cable 20 which is comprised of a pair of twisted wires 21a and 21b. A suitable electromagnetic shield may also be provided as an enclosure for the pair of twisted wires. wires 21a and 21b then couple at their opposite end to a pair of input terminals 31a and 31b of a receiver 32. Receiver 32 operates to convert the differential pair of signals on its input terminals to a corresponding digital signal on its output terminal 33.

A problem, however, with the above-described system of FIG. 1 is that the long cable 20 distorts the signals from transmitter 14, which in turn can cause errors at the receiver 32. To understand this problem, consider first the waveforms of FIGS. 2A and 2B. FIG. 2A shows the digital signal DS on input terminal 12 of encoder 11; and FIG. 2B shows a conventional frequency-encoded signal FES on input terminal 15 of transmitter 14. Signal FES includes a low frequency component $f_L$ which represents a digital "1", and it also includes a high frequency component $f_H$ which represents a digital "0". Every half-cycle of the low frequency component is of a single time duration ($1/2f_L$) and every half-cycle in the high frequency is of another signal time duration ($1/2f_H$).

Next, consider the waveform of FIG. 2C. It shows a signal $V_R$ which is the differential voltage across the input terminals of receiver 32. Ideally, signal $V_R$ should have the same shape as signal FES. However, a comparison of FIG. 2B with FIG. 2C shows that signal $V_R$ is distorted following the change from the low frequency to the high frequency. Reference numeral 41 indicates the point in time at which this distortion (hereinafter referred to as transmission line distortion) begins.

Due to the transmission line distortion in signal $V_R$, the envelope 42 of the high frequency component of signal $V_R$ is not flat. Instead, the portion of the envelope 42 which follows immediately after the low-high frequency transition 41 is bent toward the peak voltage of the last low frequency half-cycle that preceded the transition. In FIG. 2C, envelope 42 bends in a negative direction because the peak voltage in the last low frequency half-cycle that preceded transition 41 was negative. Conversely, in FIG. 2D, the envelope 42 bends in a positive direction because the peak voltage of the last low frequency half-cycle that preceded transition 41 was positive.

Since the above-described bending of envelope 42 occurs, the magnitude of the peak voltage of the first high frequency half-cycle that follows transition 41 is too small; and further, the magnitude of the next high frequency half-cycle is too large. Also, these distortions in the magnitude of the half-cycle peak voltages become more pronounced as the length of cable 20 increases. Thus, as the length of cable 20 is increased, a point is eventually reached at which receiver 32 cannot correctly convert the frequency-encoded data on its input terminals back to the corresponding digital data.

BRIEF SUMMARY OF THE INVENTION

Accordingly, one object of the invention is to provide an electronic circuit for modifying a conventional frequency-encoded signal such that the modified signal is less susceptible to transmission line distortion than a conventional frequency-encoded signal.

Another object of the invention is to provide a circuit for generating a modified frequency-encoded signal that is less susceptible to transmission line distortion directly from a digital data signal.

These and other objects are achieved by providing an electronic circuit that includes at least two major modules. One module receives conventional frequency-encoded signals (from an external source) of the type containing a serial sequence of first and second frequencies with symmetrical half-cycles; and it generates a control signal indicating when a transition occurs in the conventional frequency-encoded signals from the lower to the higher of the first and second frequencies. Another module is responsive to the control signal for modifying the conventional frequency-encoded signals such that the duration of the half-cycle that immediately follows the transition is longer than one-half the period of the higher frequency by a predetermined amount of time, while the duration of the next half-cycle is shorter by a like amount of time.

In another embodiment of the invention, a modified frequency-encoded signal that is less susceptible to transmission line distortion than a conventional frequency-encoded signal is generated directly from a digital input signal. This embodiment produces an output signal in which a low frequency signal represents a digital "1", and a high frequency represents a digital "0". And a means is provided for generating the half-cycle of the high frequency signal that immediately follows the low frequency signal with a time duration that is longer than one-half the period of the high frequency; and for generating the next half-cycle of the high frequency signal with a time duration that is less than one-half the period of the high frequency.

BRIEF DESCRIPTION OF THE DRAWINGS

Various features and advantages of the invention are described in the following Detailed Description in accordance with the accompanying drawings wherein:

FIG. 1 is a schematic diagram of a prior art system in which frequency-encoded signals of the type to which this invention pertains are transmitted and received;

FIGS. 2A–2D are a set of waveforms illustrating the operation of the FIG. 1 system;

DETAILED DESCRIPTION OF THE INVENTION

Figure 3:
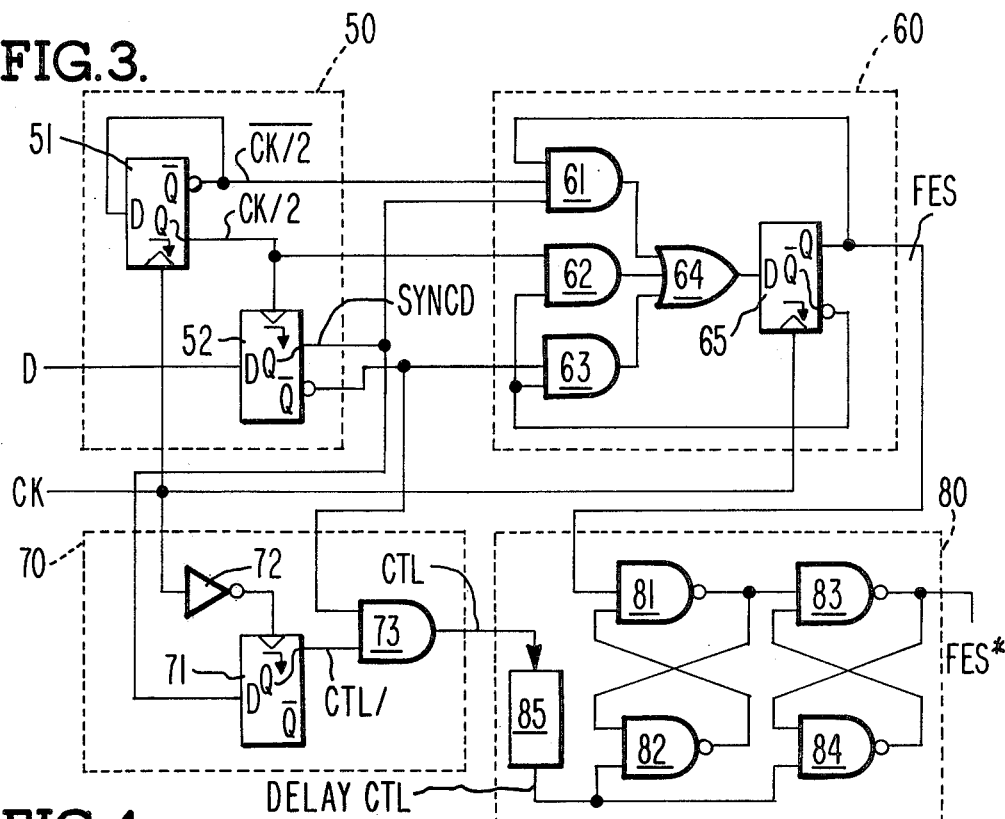
FIG. 3 is a detailed logic diagram of one preferred embodiment of the invention.
Figure 4:
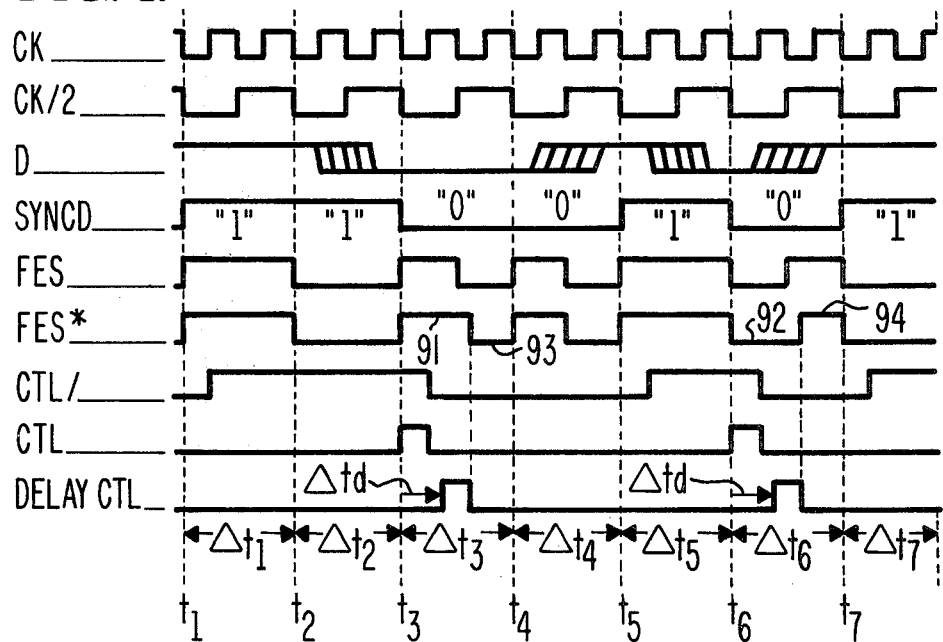
FIG. 4 is a timing diagram illustrating the operation of the FIG. 3 circuit.

Referring now to FIG. 3, one preferred embodiment of a circuit for generating modified frequency-encoded signals in accordance with the invention will be described. Some of the modules of the FIG. 3 circuit include a digital data synchronizer 50, a normal frequency encoder 60, a low-to-high frequency transition detector 70, and a half-cycle extender 80. Detailed logic diagrams of these modules are illustrated in FIG. 3; and some of the signals within them are illustrated in FIG. 4.

Synchronizer 50 includes a pair of triggerable D-type flip-flops 51 and 52. Flip-flop 51 has a trigger input terminal coupled to receive a clock signal CK which is generated by an external source (that is not shown). Signal CK is a square wave having a frequency of twice the highest frequency of the modified frequency-encoded waveform that is to be generated.

Flip-flop 51 has a $\overline{Q}$ output terminal that is coupled back to its D input terminal. Thus, flip-flop 51 operates to divide signal CK by two. Accordingly, a signal CK/2 is generated on the Q output terminal of flip-flop 51. Both of the signals CK and CK/2 are illustrated at the top of FIG. 4.

Flip-flop 52 has a clock input terminal coupled to receive signal CK/2; and it has a data input terminal coupled to receive a data signal D which is to be frequency-encoded. The state of signal D at the time when signal CK/2 makes a high voltage to low voltage transition specifies one digital bit. Signal SYNCD represents this digital bit and it is generated at the Q output terminal of flip-flop 52.

Signals D and SYNCD are illustrated in FIG. 4 below signals CK and CK/2. In this illustration, signal D is at a high voltage state during the high to low voltage transition of signal CK/2 at time instant $t_1$; and thus signal SYNCD is at a high voltage state throughout the following time interval $\Delta t_1$. Similarly, signal D is in a high voltage state when signal CK/2 makes a high voltage to low voltage transition at time instants $t_2$, $t_5$, and $t_7$; and thus signal SYNCD is high throughout the corresponding time intervals $\Delta t_2$, $\Delta t_5$, and $\Delta t_7$. Conversely, signal D is in a low voltage state at the high to low voltage transition of signal CK/2 at time instants $t_3$, $t_4$, and $t_6$; and thus signal SYNCD is low throughout the corresponding time intervals $\Delta t_3$, $\Delta t_4$, and $\Delta t_6$.

Considering next the details of encoder 61, it includes AND gates 61, 62, and 63, an OR gate 64, and triggerable D-type flip-flop 65. Flip-flop 65 has a trigger input terminal coupled to receive signal CK; and it has a data input terminal coupled to the output terminal of OR gate 64. In turn, OR gate 64 has three input terminals which are respectively coupled to the output terminals of AND gates 61, 62, and 63. These AND gates have their input terminals coupled in a fashion such that the signal FES on the Q output terminal of flip-flop 64 is a conventional frequency-encoded representation of signal SYNCD.

Gate 61 has three input terminals, one of which is coupled to the Q output terminal of flip-flop 65, another of which is coupled to the $\overline{Q}$ output terminal of flip-flop 51, and another of which is coupled to the Q output terminal of flip-flop 52. Thus, AND gate 61 causes signal FES on the Q output terminal of flip-flop 54 to go to a high voltage state upon a high to low voltage transition of signal CK if all of the signals FES, SYNCD, and CK/2 are in a high voltage state at that transition. This occurs, for example, at the high to low voltage transition of signal CK that occurs midway between time instants $t_1$ and $t_2$; and so AND gate 61 causes the high voltage state of signal FES during the second half of time interval $\Delta t_1$.

Gate 62 has two input terminals, one of which is coupled to the Q output terminal of flip-flop 51 and the other of which is coupled to the $\overline{Q}$ output terminal of flip-flop 65. Thus, AND gate 62 causes signal $\overline{FES}$ to go to a high voltage state upon a high to low voltage transition of signal CK if all of the signals CK/2 and FES are in a high voltage state at that transition. This occurs, for example, at the high to low voltage transition of signal CK at time instant $t_3$; and so AND gate 62 causes the high voltage state of signal FES during the first half of time interval $\Delta t_3$.

Gate 63 has two input terminals, one of which is connected to the $\overline{Q}$ output terminal of flip-flop 52 and the other of which is connected to the $\overline{Q}$ output terminal of flip-flop 65. Thus, AND gate 63 causes signal FES to go to a high voltage state whenever signal CK makes a high to low voltage transition at a time when all of the signals $\overline{SYNCD}$ and $\overline{FES}$ are in a high voltage state. This occurs, for example, at time instant $t_4$; and thus AND gate 63 causes the high voltage state of signal FES during the first half of time interval $\Delta t_4$.

Next, consider the details of detector 70. It includes a D-type triggerable flip-flop 71, an inverter 72, and an AND gate 73. Flip-flop 71 has a trigger input terminal coupled to the output terminal of inverter 72; and inverter 72 in turn has an input terminal coupled to receive signal CK. Thus, flip-flop 71 is triggered on a low to high voltage transition of signal CK. Flip-flop 71 also has a D input terminal coupled to the Q output terminal of flip-flop 52, and it has a Q output terminal coupled to one input terminal of AND gate 73. Another input terminal of AND gate 73 couples to the $\overline{Q}$ output terminal of flip-flop 52.

In operation, circuit 70 generates a control signal CTL on the output of AND gate 73 whenever a low frequency to high frequency transition occurs in signal FES. Control signal CTL is a high voltage level pulse that lasts for one-half the period of clock signal CK; and it is formed by logically ANDing signal $\overline{SYNCD}$ with another signal CTL1 from the Q output terminal of flip-flop 71. Signal CTL1, as illustrated in FIG. 4, is identical in shape to signal SYNCD but it is delayed by one-half of the period of signal CK. This delay is due to inverter 72 which causes flip-flop 71 to be triggered on the low to high voltage transitions of signal CK, as opposed to the high to low voltage transitions of signal CK.

Considering next the details of circuit 80, it includes four NAND gates 81, 82, 83, and 84 and a delay line 85. Gates 81 and 82 are cross-coupled to form one flip-flop; and gates 83 and 84 are also cross-coupled to form another flip-flop. Control signal CTL is coupled to an input terminal of delay line 85 which in turn has an output terminal coupled to respective input terminals on NAND gates 82 and 84. Signal FES is coupled to an input terminal of NAND gate 81; an output terminal of NAND gate 81 couples to an input terminal of NAND gate 83; and NAND gate 83 generates the modified frequency-encoded data signal FES* on its output terminal.

As explained above, signal CTL is a high voltage level pulse that only occurs when a low to high frequency transition occurs in signal FES. Thus, signal CTL is generally in a low voltage state. That low voltage passes throug delay line 85 which in turn forces the signal on the output terminals of NAND gates 82 and 84 to a high voltage state. With the signals on the output terminals of NAND gates 82 and 84 being in a high voltage state, signal FES passes directly through NAND gates 81 and 83 to form the modified frequency-encoded data signal FES*.

Conversely, when signal CTL is in a high voltage state, that high voltage passes through delay line 85 after a time delay of $\Delta t_d$ whereupon it is sent to NAND gates 82 and 84. This in turn allows the flip-flops that are made from gates 82-84 to latch. If the input voltage to NAND gate 81 is in a low voltage state, the output of NAND gate 81 will latch high; whereas if the input voltage to NAND gate 83 is in a low voltage state, the output of NAND gate 83 will latch high.

As long as these flip-flops remain latched, the state of signal FES* will not change and thus the desired extension of the first half-cycle that follows the low to high frequency transition in signal FES is achieved. Thereafter, when signal CTL goes back to a low voltage state, that low voltage passes through delay line 85 after the time delay of $\Delta t_d$ which in turn causes the flip-flops to unlatch and pass signal FES directly through NAND gates 81 and 83.

FIG. 4 shows two of the above-described half-cycle extensions in signal FES*. These extensions are indicated by reference numerals 91 and 92. Note that in extended half-cycle 91 the time duration of a high voltage level increased; whereas in half-cycle 92, the time duration of a low voltage level is increased. Also, the next half-cycle in signal FES* which follows the extended half-cycles 91 and 92 are shortened by a like amount. Reference numeral 93 indicates the shortened half-cycle that follows extended half-cycle 91; and reference numeral 94 indicates the shortened half-cycle that follows extended half-cycle 92.

Figure 5:
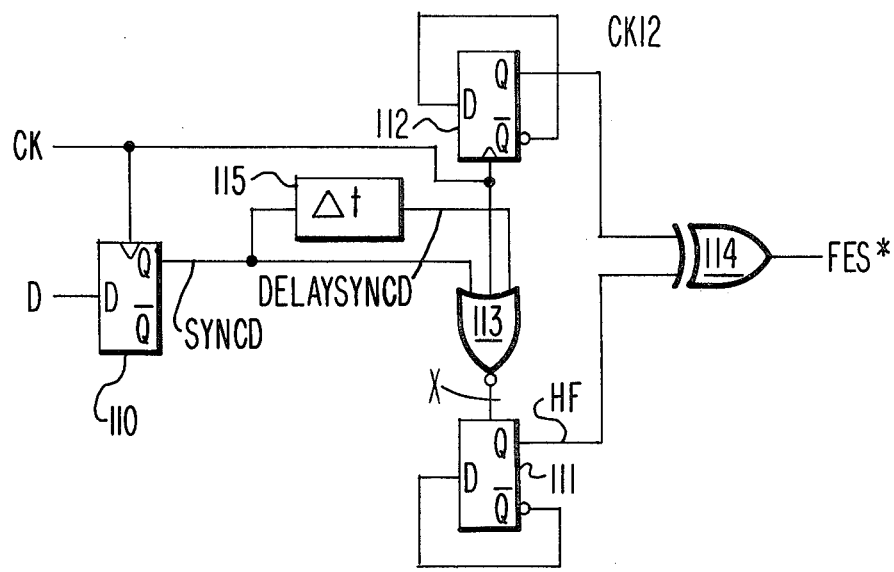
FIG. 5 is a detailed logic diagram of another preferred embodiment of the invention.

Referring now to FIG. 5, another preferred embodiment of the invention will be described in detail. This embodiment is similar to the previously described FIG. 3 embodiment in that it also generates the modified frequency-encoded data signal FES* in which the time duration of the high frequency half-cycle that immediately follows each low-high frequency transition is longer than one-half the period of the higher frequency by a predetermined amount of time, and the duration of the next half-cycle is shorter by a like amount of time. However, the FIG. 5 embodiment differs primarily from the FIG. 3 embodiment in that it generates the modified frequency-encoded signal FES* directly from the digital data input signal D. That is, it does not receive the normal frequency-encoded signal FES and thereafter modify signal FES to signal FES*.

Included in the FIG. 5 embodiment are three triggerable D-type flip-flops 110, 111, and 112, a NOR gate 113, an exclusive OR gate 114, and a delay line 115. Flip-flop 110 has a trigger input terminal coupled to receive a clock signal CK which is a square wave having a frequency that equals the higher frequency in the modified frequency-encoded signal FES*. Signal CK is illustrated as the topmost waveform in FIG. 6.

Figure 6:
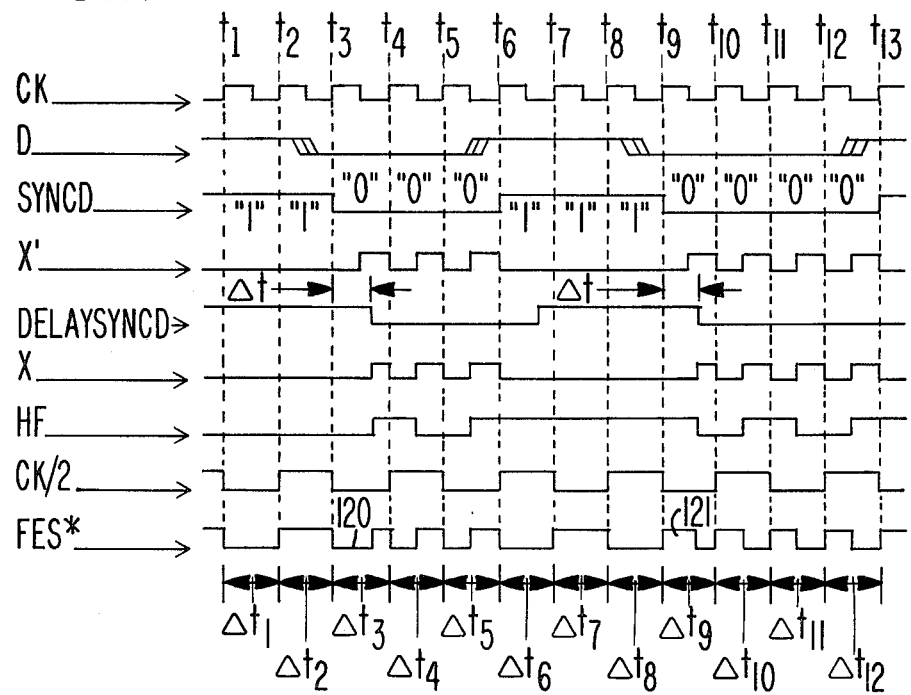
FIG. 6 is a timing diagram illustrating the operation of the FIG. 5 embodiment.

Flip-flop 110 also has a data input terminal coupled to receive the digital data signal D that is to be frequency-encoded. Signal D is illustrated in FIG. 6 below signal CH. If signal D is in a high voltage state at the time instant when signal CK makes a low voltage to high voltage transition, then it equals a digital "1"; whereas if signal D is in a low voltage state when signal CK makes a low voltage to high voltage transition, then it equals a digital "0".

All of the time instants at which signal CK makes a low voltage to high voltage transition are indicated in FIG. 6 as time instants $t_1, t_2 \ldots t_{13}$. Signal D is in a high voltage state at time instants $t_1, t_2, t_6, t_7, t_8$, and $t_{13}$, and thus the output signal SYNCD from the Q output terminal of flip-flop 110 represents a digital "1" following those time instants. Conversely, signal D is in a low voltage state at time instants $t_3, t_4, t_5, t_9, t_{10}, t_{11}$, and $t_{12}$; and thus signal SYNCD represents a digital "0" following those time instants.

NOR gate 113 has three input terminals. One of those terminals is coupled to receive signal SYNCD; another is coupled to receive signal CK; and another is coupled to receive a signal DELAYSYNCD from the output terminal of delay line 115. Delay line 115 then has its output terminal coupled to receive signal SYNCD.

Consequently, whenever signal SYNCD is in a high voltage state, the output signal X of NOR gate 113 is forced to a low voltage state. Conversely, whenever signal SYNCD is in a low voltage state, signal X from NOR gate 113, with one exception, equals the inverse of signal CK. That one exception occurs for a time interval of $\Delta t$ following each high voltage to low voltage transition of signal SYNCD. That one exception occurs for a time interval of $\Delta t$ following each high voltage to low voltage transition of signal SYNCD. During such time intervals, the output signal DELAYSYNCD from delay line 115 continues to force the output signal Q of NOR gate 113 to a low voltage state.

These operations are illustrated in FIG. 6 by waveforms X', DELAYSYNCD, and X. Signal X' illustrates the voltage which would be generated on the output terminal of NOR gate 113 if delay line 115 were removed. Inspection of signal X' shows that it is in a low voltage state whenever signal SYNCD is in a high voltage state; and it is the inverse of signal CK whenever signal SYNCD is in a low voltage state.

Comparing now signal X' with signal X, it can be seen that those two signals are identical except during time intervals $\Delta t_3$ and $\Delta t_9$. Those time intervals follow a high voltage to low voltage transition of signal SYNCD. And during those time intervals, signal DELAYSYNCD continues to force signal X low for a time duration of $\Delta t$.

Flip-flop 111 has a trigger input terminal coupled to receive signal X; and it has a Q output terminal coupled back to its data input terminal. Consequently, signal HF on the Q output terminal of flip-flop 111 changes state whenever signal X makes a low voltage to high voltage transition. Signal HF is illustrated in FIG. 6 below signal X.

Gate 114 has one input terminal coupled to receive signal HF; and it has another input terminal coupled to a Q output terminal of flip-flop 112. In turn, flip-flop 112 has a Q output terminal coupled back to a data input terminal; and it has a trigger input terminal coupled to receive signal CK. Consequently, the output signal CK/2 on the Q output terminal of flip-flop 112 equals signal CK divided by two.

Gate 114 performs an exclusive OR operation on signals HF and CK/2; and the result of this exclusive OR operation forms the modified frequency-encoded data signal FES*. Signal FES* is generated on the output terminal of gate 114 as illustrated in the bottom waveform of FIG. 6.

As illustrated in FIG. 6, all of the half-cycles of signal FES* are symmetrical except those that occur during time intervals $\Delta t_3$ and $\Delta t_9$. Those time intervals occur immediately after a low frequency to high frequency transition in signal FES*. Consequently, in accordance with the invention, the first half-cycle of signal FES* during time intervals $\Delta t_3$ and $\Delta t_9$ is extended beyond one-half the period of the high frequency; and the next half-cycle is shortened by a like amount of time.

Reference numeral 120 indicates the extended half-cycle in signal FES* during time interval $\Delta t_3$; whereas reference numeral 121 indicates the extended half-cycle in signal FES* during time interval $\Delta t_9$. These extended half-cycles 120 and 121 have a time duration of $\Delta t$; and they are caused by signal DELAYSYNCD inhibiting the output signal of NOR gate 113 from making a low to high voltage transition by that same time interval $\Delta t$.

Figure 7A:
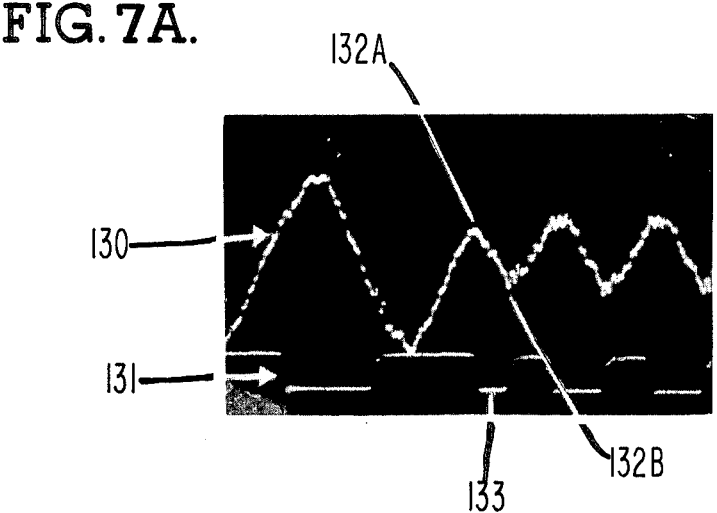
FIGS. 7A and 7B are photographs which compare the transmission line distortion that occurs in a conventional frequency-encoded signal and in the modified frequency-encoded signal of the invention.
Figure 7B:
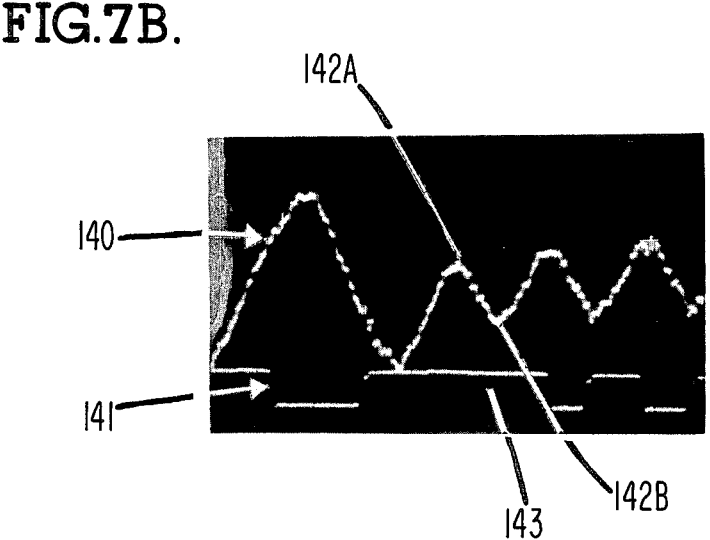

Referring now to FIGS. 7A and 7B, there is illustrated a pair of photographs which show that the modified frequency-encoded signal that is generated in accordance with this invention is in fact substantially less susceptible to transmission line distortion than a conventional frequency-encoded signal. To obtain these photographs, a test setup was utilized that was identical to the previously described system of FIG. 1. Transmitter 14 was a T²L 75113 circuit; receiver 32 was a T²L 75115 circuit; cable 20 was a 1,000 foot length of an unshielded twisted pair of 22 gauge wires; and both wires of the twisted pair were terminated at their receiving end and at their transmitting end with 75 ohm resistors.

Also in the test setup, circuit 11 was constructed to be identical to the above-described FIG. 6 embodiment of the invention. Clock signal CK was a square wave with a period of 200 nanoseconds; and the digital signal D that was frequency-encoded was generated from an external source as a cyclic sequence of sixteen "1" bits followed by sixteen "0" bits. Delay line 115 in the FIG. 6 circuit was selected such that the first half-cycle of the high frequency component of signal FES* was 120 nanoseconds, while the next half of the cycle was 80 nanoseconds.

This signal FES* produced a differential voltage waveform across the input terminals of receiver 32 as indicated in the FIG. 7A photograph by reference numeral 130. Also, the corresponding output voltage of receiver 32 is indicated in that same photograph by reference numeral 131. By comparison, voltage waveforms 140 and 141 in the photographs of FIG. 7B respectively show the differential voltage across the input terminals of receiver 32 and the output voltage of receiver 32 with delay line 115 removed from the FIG. 6 circuit. Under such conditions, the output signal generated by the FIG. 6 circuit corresponds to the conventional frequency-encoded signal FES.

Each grid spacing in the horizontal direction for all of the waveforms of FIG. 7A and 7B represents a time interval of 100 nanoseconds. Also, each grid spacing in the vertical direction for waveforms 130 and 140 represents 500 millivolts; whereas each grid spacing for waveforms 131 and 141 represents 5 volts.

A comparison of waveform 130 with waveform 140 clearly shows that in the latter, the peak voltage 142A of the first high frequency half-cycle is too small; and further, the peak voltage 142B of the next high frequency half-cycle is too large. Consequently, receiver 32 was unable to detect the presence of the first high frequency cycle, as is evident by the absence of a pulse in waveform 141 at time instant 143.

By comparison, in waveform 130, the peak voltage 132A of the first high frequency half-cycle is substantially increased, and the peak voltage 132B of the next high frequency half-cycle is substantially reduced. And as a result, receiver 32 was able to detect the first high frequency cycle as is evident by the presence of a pulse in waveform 131 at time instant 133.

Various preferred embodiments of the invention have now been described in detail. In addition, however, many changes and modifications can be made to these details without departing from the nature and spirit of the invention. Accordingly, it is to be understood that the invention is not limited to said details but is defined by the appended claims.

What is claimed is:

1. An electronic circuit for generating a modified frequency-encoded signal that is less suceptible to transmission line distortion than a conventional frequency-encoded signal of the type that includes a serial sequence of a relatively low and a relatively high frequency with symmetrical half-cycles, said circuit comprising:

means fo receiving a signal from an external source that is representative of the signal which is to be modified frequency-encoded, and for generating a control signal indicating when a transition occurs in the corresponding conventional frequency-encoded signal from said relatively low to said relatively high frequency; and means responsive to said control signal for receiving said corresponding conventional frequency-encoded signal from another external source, and modifying the same such that the duration of the half-cycle that immediately follows said transition is longer than one-half the period of said relatively high frequency by a predetermined amount of time and the duration of the next half-cycle is shorter by a like amount of time.

2. A circuit according to claim 1 wherein said means for modifying said conventional frequency-encoded signal includes a means for storing said conventional frequency-encoded signal in response to said control signal.

3. A circuit according to claim 2 wherein said means for storing includes a first flip-flop means for latching a high voltage state of said conventional frequency-encoded signal in response to said control signal and includes a second flip-flop means for latching a low voltage state of said conventional frequency-encoded signal in response to said control signal.

4. A circuit according to claim 3 wherein said means for generating said control signal includes a means for generating a pulse in response to said transition as said control signal, said means for modifying includes a means for delaying said pulse, and said first and second flip-flop means are adapted to latch said conventional frequency-encoded signal in response to the delayed pulse from said means for delaying.

5. A circuit according to claim 4 wherein the time delay of said pulse through said means for delaying equals the time duration of said half-cycle that immediately follows said transition minus the time duration of said pulse.

6. An electronic circuit for generating a modified frequency-encoded signal that is less susceptible to transmission line distortion than a conventional frequency-encoded signal of the type that includes a serial sequence of a relatively low and a relatively high frequency with symmetrical half-cycles, said circuit comprising:
   means for receiving a digital signal having first and second voltage states from an external source that is to be encoded into said modified frequency-encoded signal;
   means for generating said relatively low frequency component of said modified frequency-encoded signal when said first voltage state of said digital signal is being received, and for generating said relatively high frequency component of said modified frequency-encoded signal when said second voltage state of said digital signal is being received;
   said means for generating said relatively high frequency component including means for generating the first high frequency half-cycle that follows immediately after said relatively low frequency with a time duration that is longer than one-half the period of said relatively high frequency by a predetermined amount of time, and for generating the next half-cycle with a time duration that is less than one-half the period of said relatively high frequency by a like amount of time.

7. A circuit according to claim 6 wherein said means for generating said relatively high frequency component includes a means for generating pulses which correspond to respective cycles in said relatively high frequency component of said modified frequency-encoded signal.

8. A circuit according to claim 7 wherein said means for generating said pulses includes a means for delaying those pulses, relative to the remaining pulses, which correspond to the first high frequency cycles that follow immediately after said relatively low frequency component in said modified frequency-encoded signal.

9. A circuit according to claim 8 wherein said means for generating said relatively high frequency component further includes a first triggerable flip-flop means which is coupled to receive and be triggered by said pulses, and wherein said means for generating said relatively low frequency component includes a second triggerable flip-flop means which is clocked out of phase with said first triggerable flip-flop means.

10. A circuit according to claim 9 which further include a means for EXCLUSIVE OR-ing output signals from said first and second triggerable flip-flop means to form said modified frequency-encoded signal.

11. An electronic circuit for producing a signal that includes a low frequency component signal followed by a high frequency component signal such that said composite signal resists transmission line distortion, said circuit comprising:
   means for generating the half-cycle of said high frequency component signal that immediately follows said low frequency component signal with a time duration that is longer than one-half the period of said high frequency by a predetermined amount of time; and
   means for generating the next half-cycle of said high frequency component signal with a time duration that is less than one-half the period of said high frequency by a like amount of time.

* * * * *